Nov. 3, 1959 K. H. MYERS ET AL 2,911,238
EXPANSION JOINT HAVING ADAPTOR MEMBER
MOUNTED BELLOWS SEALING MEANS
Filed March 1, 1956 2 Sheets-Sheet 1
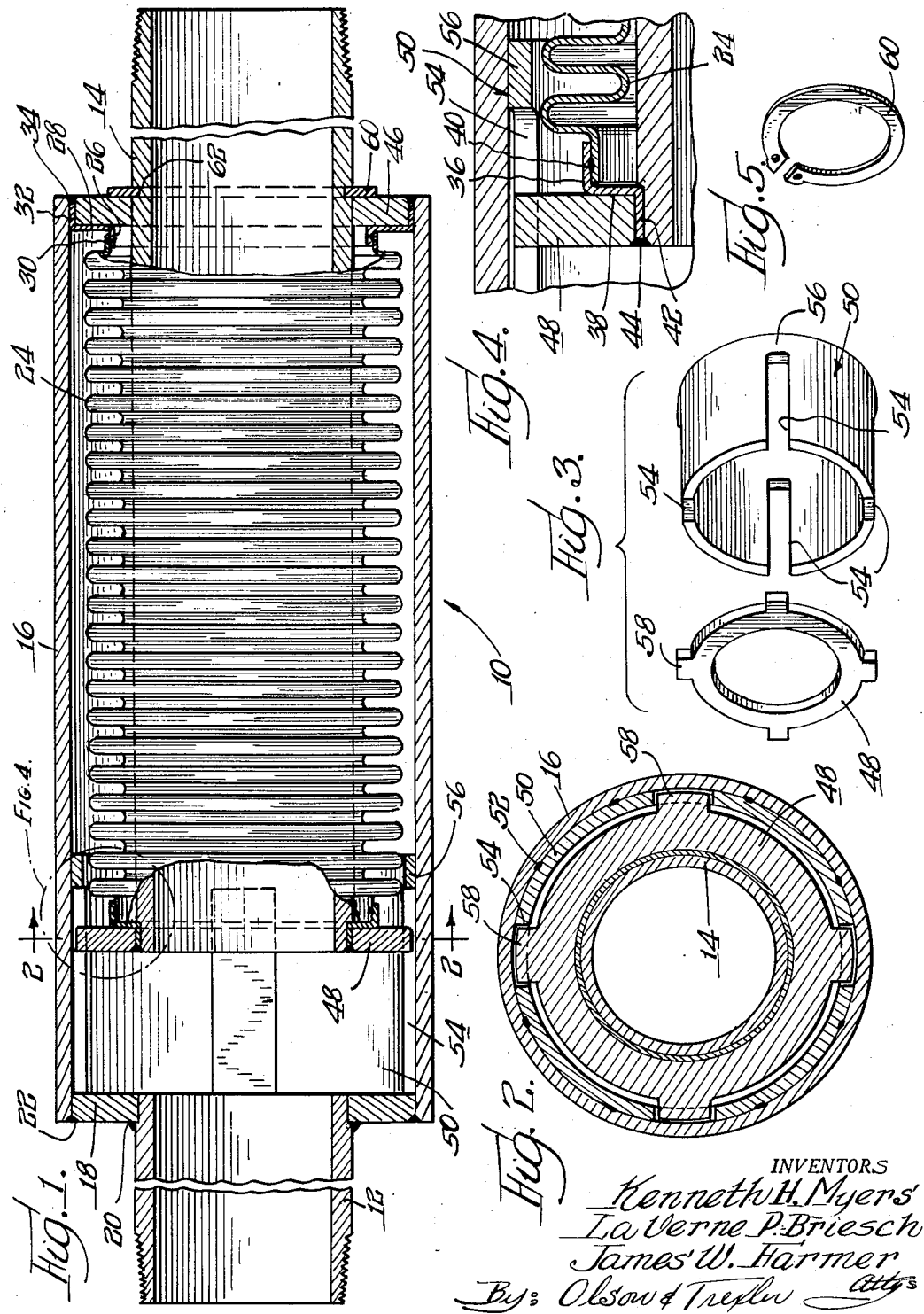
INVENTORS
Kenneth H. Myers
La Verne P. Briesch
James W. Harmer
By: Olson & Trexler Attys.

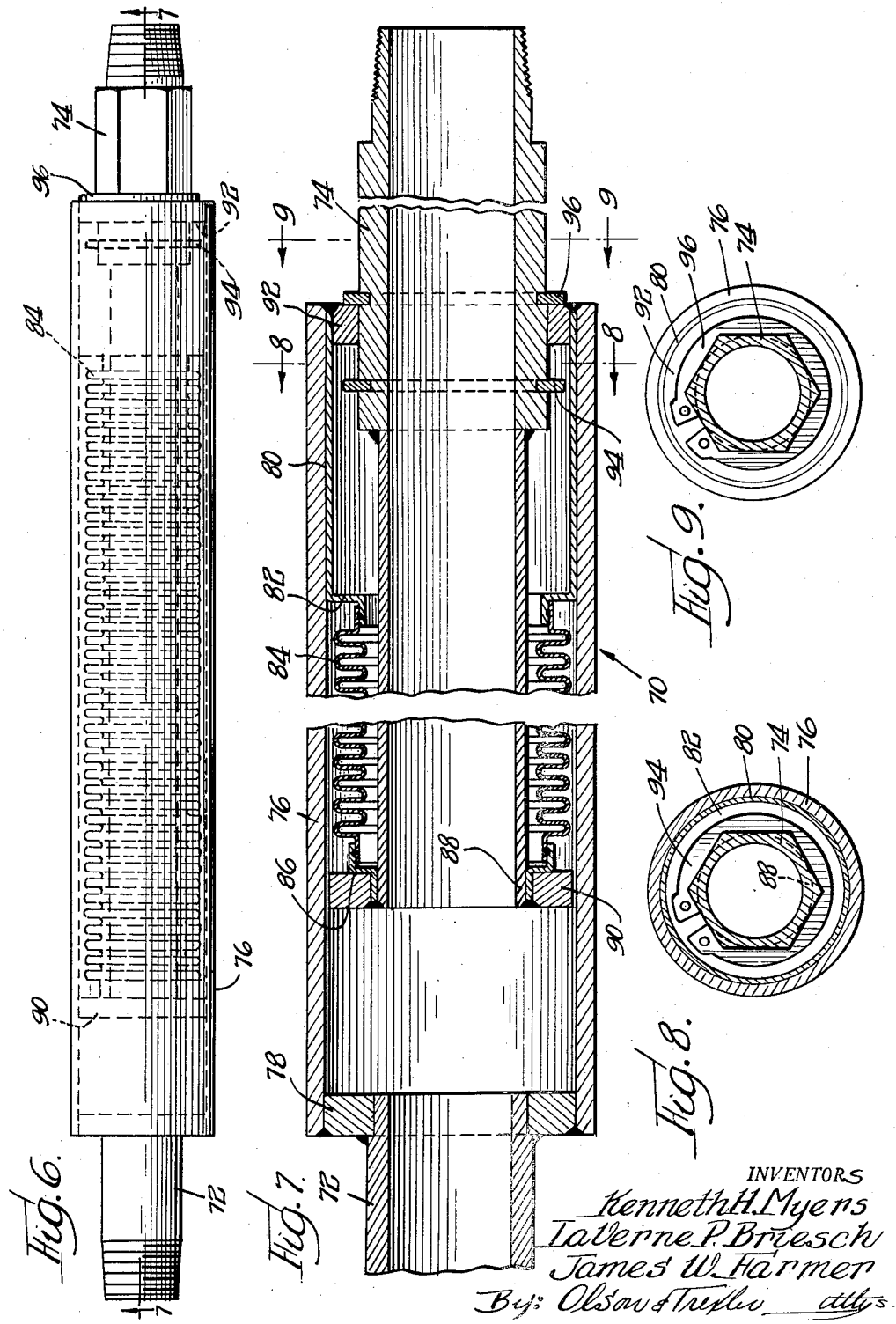

2,911,238

EXPANSION JOINT HAVING ADAPTOR MEMBER MOUNTED BELLOWS SEALING MEANS

Kenneth H. Myers, West Dundee, James W. Farmer, Elgin, and La Verne P. Briesch, West Dundee, Ill., assignors to Flexonics Corporation, Maywood, Ill., a corporation of Illinois Application March 1, 1956, Serial No. 568,750

3 Claims. (Cl. 285—286)

The present invention relates to a novel expansion joint, and more particularly to a novel expansion joint of the type including a section of corrugated tubing and adapted to absorb expansion and contraction in a piping system resulting from temperature variation.

An object of the present invention is to provide a novel expansion joint of relatively simple and rugged construction wherein opposite ends of the joint are retained against relative rotation or twisting during installation of the joint as well as during subsequent operation while being free to shift axially relative to each other limited amounts to compensate for expansion or contraction in a piping system.

Another object of the present invention is to provide a novel expansion joint of the above described type which is constructed so as to prevent a fluid stream flowing therethrough from contacting the corrugated tubing whereby to promote smooth fluid flow and to prevent erosion of the corrugated tubing.

A further object of the present invention is to provide a novel expansion joint of the above described type which is constructed so as to accommodate relatively high pressures while being relatively light in weight and small in diameter.

Other objects and advantages of the present invention will become apparent from the following description and the accompanying drawings wherein:

Fig. 1 is a partial longitudinal cross sectional view showing an expansion joint constructed in accordance with the present invention;

Fig. 2 is a cross sectional view taken along line 2—2 in Fig. 1;

Fig. 3 is an exploded perspective view showing certain elements of the expansion joint which cooperate to prevent opposite ends of the point from twisting relative to each other;

Fig. 4 is an enlarged fragmentary sectional view of the portion of the expansion joint structure enclosed by the broken line circle in Fig. 1;

Fig. 5 is a perspective view showing a split ring removably applied to an end nipple of the expansion joint to prevent the joint from extending during installation;

Fig. 6 is an elevational view showing a modified form of the present invention;

Fig. 7 is an enlarged fragmentary sectional view taken along line 7—7 in Fig. 6;

Fig. 8 is a sectional view on a reduced scale taken along line 8—8 in Fig. 7; and Fig. 9 is a sectional view on a reduced scale taken along line 9—9 in Fig. 7.

Referring now more specifically to the drawings, wherein like parts are designated by the same numerals throughout the various figures, an expansion joint 10 which includes the principles of the present invention is disclosed in Figs. 1 through 5. The expansion joint 10 comprises a pair of opposite end pipe nipples 12 and 14 which are adapted to be connected in a piping system, not shown, in a known manner. An outer cylindrical body member 16 has one end thereof sealed and connected to the nipple 12 by means of an annular member 18 which is welded to the nipple and the body member 16 by annular welds 20 and 22 respectively. The body member 16 telescopes over a substantial length of the nipple 14 and is interconnected with the nipple 14 in a manner which permits the nipples 12 and 14 to shift axially with respect to each other but which retains nipples against twisting or rotating relative to each other.

In order to permit the joint to expand and contract, an elongated corrugated tube 24 is disposed between the body member 16 and the nipple 14. An outer end of the corrugated tube is secured and sealed to a cylindrical end portion 26 of an adapter 28 by means of an annular weld 30, which adapter has a radially outwardly disposed opposite cylindrical end portion 32 secured and sealed to an end of the body member 16 by means of an annular weld 34. The opposite or inner end of the corrugated tube is similarly secured to the inner end of the nipple 14. More specifically, as shown in Fig. 4, the opposite end of the corrugated tube is welded to a cylindrical portion 36 of an adapter member 38 as at 40, which adapter member has a radially inwardly disposed cylindrical portion 42 secured and sealed to the inner end of the nipple 14 by an annular weld 44. With this structure it is seen that fluid pressure within the expansion joint is built up in the space between the cylindrical body 16 and the corrugated tube or bellows so that the pressure is applied externally to the bellows while the space between the corrugated tube or bellows and the nipple 14 is vented to the surrounding atmosphere. The application of the line pressure externally to the bellows permits the expansion joint to accommodate higher pressure than it could withstand internally and also substantially reduces the tendency of the corrugated tube or bellows to squirm as is the case when the pressure is applied internally.

In order to maintain the nipple 14 centrally within and axially aligned with the body member 16, a guide ring 46 is disposed within the cylindrical portion 32 of the adapter 28 and retained by the weld 34, and another guide ring 48 is disposed around the cylindrical portion 42 of the adapter 38 and is secured by the weld 44. The guide ring 46 is slidable with respect to the nipple 14 while the guide ring 48 is slidable with respect to the cylindrical body member 16.

In accordance with an important feature of the present invention, means is provided for preventing the nipple 14 from rotating relative to the cylindrical body member 16 and thus relative to the nipple 12. This means includes a sleeve 50 disposed within the cylindrical body member and secured thereto by a plurality of spot welds 52. The sleeve 50 is provided with a plurality of axially extending circumferentially spaced slots 54 which may open at one end of the sleeve adjacent the member 18 but terminate short of an opposite continuous end portion 56 of the sleeve. The guide ring 48 which is slidable within the sleeve 50 is provided with a plurality of circumferentially spaced lugs 58 that extend into the slots 54 so that relative rotation between the body member 16 and the nipple 14 is precluded. The lugs 58 also cooperate with the continuous end portion 56 of the sleeve to provide a stop preventing undue extension of the joint and resulting compression of the corrugated tube. Undue contraction of the joint and simultaneous extension of the corrugated tube is prevented when the guide ring 48 engages the annular member 18.

Prior to installation in a piping system, the expansion joint is partially extended and the corrugated tube is placed under compression as shown in Fig. 1, and the joint is maintained in this position by means of a split retaining ring 60 which is removably disposed in a slot 62 in the nipple 14 for engagement with the guide ring 46. The force of the partially compressed corrugated tube maintains the ring 60 against the guide ring 46 during installation of the expansion joint, and the ring 60 prevents the corrugated tube from being extended inadvertently during such installation. This assures that the corrugated tube will, after installation of the expansion joint, remain at the desired length properly to allow for motion in both directions. After the installation of the joint has been completed, the ring 60 is removed to permit free axial movement of the nipple 14 relative to the nipple 12 within the limits described above.

In Figs. 6 through 9 there is shown an expansion joint 70 which embodies a modified form of the present invention. This construction is similar to that described above except for the means provided to prevent relative twisting or turning of the opposite ends and the means for limiting relative axial movement of the opposite ends. Thus, the expansion joint 70 comprises a pair of opposite end pipe nipples 72 and 74, and an outer cylindrical body member 76 which has one end closed and connected to the nipple 72 by an annular member 78. The opposite end of the cylindrical body member is welded to an elongated cylindrical portion 80 of a sheet metal adapter 82 which is also welded to one end of a corrugated tube 84. The opposite end of the corrugated tube is welded to an adapter member 86, which adapter member is welded to an inner end of a pipe section 88 that is welded to and forms an extension of the nipple 74.

In this embodiment the above described slotted guide sleeve has been eliminated and an inner guide ring 90 without radially projecting lugs surrounds and is secured to a portion of the adapted member 86 and is freely slidable within the cylindrical body member 76. In order to prevent relative twisting or turning between the opposite end nipples, the nipple 74 is provided with a non-circular exterior configuration, and a guide ring 92 which is disposed within and welded to the outer end of the adapter member 80 is provided with a complementary non-circular aperture slidably receiving the nipple 74. In the embodiment shown the configuration of the nipple 74 and the guide ring 92 aperture is hexagonal.

Undue extension of the expansion joint 70 is precluded by means of a split stop ring 94 which is snapped into an annular groove in the nipple 74 located axially within the guide ring 92. Thus axial extension of the joint will be limited by engagement between the guide ring 92 and the stop ring 94. Another split retaining or stop ring 96 is removably snapped into another groove in the nipple 74. The stop ring 96 is positioned and functions in the same manner as the corresponding ring 60 in the expansion joint 10 described above so that the corrugated tubing 84 will be held in a partially compressed condition during installation of the expansion joint 70 in a piping system. After the installation has been completed, the retaining ring 96 is removed.

From the above description it is seen that the present invention has provided a novel expansion joint which is of simple, compact and rugged construction and which permits opposite end portions to be freely expanded or contracted within limits while being restrained against relative twisting or turning. It is also seen that the present invention has provided a novel expansion joint wherein the fluid pressure is applied externally to the corrugated tubing so as to eliminate squirming of the tubing and to enable the tubing to accommodate higher pressures. It is to be further noted that the fluid pasageway through the expansion joint of the present invention is provided by smooth walled pipe sections so as to promote non-turbulent fluid flow and to protect the corrugated tube from contact with the fluid stream.

While the preferred embodiments of the present invention have been shown and described herein, it is obvious that many structural details may be changed without departing from the spirit and scope of the appended claims.

The invention is claimed as follows:

1. An expansion joint comprising first and second generally axially aligned opposite end pipe means, a ring member receiving and annularly welded and sealed to said first pipe means, a sleeve having one end annularly welded and sealed to an outer margin of said ring member, said sleeve including a portion loosely telescoping over said second pipe means, a sheet metal annular adaptor member having a first cylindrical portion within and secured to and sealed to an opposite end of said sleeve by a weld, a guide ring within said first cylindrical portion and secured by said weld to said sleeve and said adaptor member and slidably receiving said second pipe means, said adaptor member having a second cylindrical portion offset radially inwardly from said first cylindrical portion and radially spaced from said sleeve and said second pipe means, a corrugated tube having one end telescoped with and welded and sealed to said second cylindrical portion of said adaptor member, a second annular sheet metal adaptor member having a first cylindrical portion disposed around said second pipe means and secured to and sealed to the inner end of said second pipe means by a second weld, a second giude ring disposed around the first cylindrical portion of said second adaptor member and secured by said second weld to said second pipe means and said second adaptor member and slidably disposed within said sleeve, said second adaptor member having a second cylindrical portion offset radially outwardly from the first cylindrical portion thereof and radially spaced from said sleeve and said second pipe means, the opposite end of said corrugated tube being telescoped with and welded and sealed to the second cylindrical portion of said second adaptor member, a pair of interengageable relatively axially shiftable means respectively carried by said sleeve and said second pipe means for preventing said first and second pipe means from turning relative to each other, a retaining means removably mounted on the second pipe means and normally engaging the outer side of the guide ring welded to the sleeve, whereby said retaining means maintains said second guide ring spaced from said ring member during installation and a pair of engageable means respectively carried by said sleeve and said second pipe means for limiting relative axial movement between said first and second pipe means.

2. An expansion joint comprising first and second generally axially aligned opposite end pipe means, a ring member receiving and annularly welded and sealed to said first pipe means, a sleeve having one end annularly welded and sealed to an outer margin of said ring member, said sleeve including a portion loosely telescoping over said second pipe means, a sheet metal annular adaptor member having a first cylindrical portion within and secured to and sealed to an opposite end of said sleeve by a weld, a guide ring within said first cylindrical portion and secured by said weld to said sleeve and said adaptor member and slidably receiving said second pipe means, said adaptor member having a second cylindrical portion offset radially inwardly from said first cylindrical portion and radially spaced from said sleeve and said second pipe means, a corrugated tube having one end telescoped with and welded and sealed to said second cylindrical portion of said adaptor member, a second annular sheet metal adaptor member having a first cylindrical portion disposed around said second pipe means and secured to and sealed to the inner end of said second pipe means by a second weld, a second guide ring disposed around the first cylindrical portion of said second adaptor member and secured by said second weld to said second pipe means and said second adaptor member and slidably disposed within said sleeve, said second adaptor member having a second cylindrical portion offset radially outwardly from the first cylindrical portion thereof and radially spaced from said sleeve and said second pipe means, the opposite end of said corrugated tube being telescoped with and welded and sealed to the second cylindrical portion of said second adaptor member, and a pair of engageable means respectively carried by said sleeve and said second pipe means for limiting relative axial movement between said first and second pipe means, a second sleeve member secured within said first mentioned sleeve and having axially extending slot means therein, and lug means projecting from said second guide ring into said slot means, and said second mentioned pair of engageable means comprises a portion of said second sleeve closing an end of said slot means and an axially facing surface of said lug means engageable with said last mentioned portion.

3. An expansion joint comprising first and second generally axially aligned opposite end pipe means, a ring member receiving and annularly welded and sealed to said first pipe means, a sleeve having one end annularly welded and sealed to an outer margin of said ring member, said sleeve including a portion loosely telescoping over said second pipe means, a sheet metal annular adaptor member having a first cylindrical portion within and secured to and sealed to an opposite end of said sleeve by a weld, a guide ring within said first cylindrical portion and secured by said weld to said sleeve and said adaptor member and slidably receiving said second pipe means, said adaptor member having a second cylindrical portion offset radially inwardly from said first cylindrical portion and radially spaced from said sleeve and said second pipe means, a corrugated tube having one end telescoped with and welded and sealed to said second cylindrical portion of said adaptor member, a second annular sheet metal adaptor member having a first cylindrical portion disposed around said second pipe means and secured to and sealed to the inner end of said second pipe means by a second weld, a second guide ring disposed around the first cylindrical portion of said second adaptor member and secured by said second weld to said second pipe means and said second adaptor member and slidably disposed within said sleeve, said second adaptor member having a second cylindrical portion offset radially outwardly from the first cylindrical portion thereof and radially spaced from said sleeve and said second pipe means, the opposite end of said corrugated tube being telescoped with and welded and sealed to the second cylindrical portion of said second adaptor member, means providing said first guide ring with a non-circular inner margin and means providing said second pipe means with a complementary non-circular exterior shape, and a pair of engageable means comprising radially projecting means on said second pipe means and an axially facing surface of said first mentioned guide ring engageable with said radially projecting means for limiting relative axial movement between said first and second pipe means.

References Cited in the file of this patent

UNITED STATES PATENTS

| | | |
|---|---|---|
| 1,873,703 | Giesler | Aug. 23, 1932 |
| 1,893,434 | Muller | Jan. 3, 1933 |
| 1,992,612 | Hall | Feb. 26, 1935 |
| 2,223,691 | Lockwood | Dec. 3, 1940 |
| 2,337,038 | Fentress | Dec. 21, 1943 |